US010085066B2

(12) United States Patent
Groman

(10) Patent No.: US 10,085,066 B2
(45) Date of Patent: *Sep. 25, 2018

(54) METHOD AND SYSTEM FOR SOURCING AND EDITING LIVE VIDEO

(71) Applicant: NBCUniversal Media, LLC, New York, NY (US)

(72) Inventor: Philip Groman, Oakland, CA (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,536

(22) Filed: Mar. 27, 2017

(65) Prior Publication Data

US 2017/0230719 A1 Aug. 10, 2017

Related U.S. Application Data

(63) Continuation of application No. 14/018,095, filed on Sep. 4, 2013, now Pat. No. 9,747,946.

(60) Provisional application No. 61/863,782, filed on Aug. 8, 2013.

(51) Int. Cl.
*H04N 21/4788* (2011.01)
*H04N 21/431* (2011.01)
*G11B 27/036* (2006.01)
*H04N 21/234* (2011.01)
*H04N 21/254* (2011.01)
*H04N 21/4627* (2011.01)
*H04N 21/2187* (2011.01)

(52) U.S. Cl.
CPC ....... *H04N 21/4788* (2013.01); *G11B 27/036* (2013.01); *H04N 21/23424* (2013.01); *H04N 21/2541* (2013.01); *H04N 21/4312* (2013.01); *H04N 21/4627* (2013.01); *H04N 21/2187* (2013.01)

(58) Field of Classification Search
CPC ........ H04N 21/4788; H04N 21/23424; H04N 21/2541; H04N 21/4627; H04N 21/4312; H04N 21/2187; G11B 27/036
See application file for complete search history.

(56) References Cited

U.S. PATENT DOCUMENTS

| | | | |
|---|---|---|---|
| 8,249,153 B2 | 8/2012 | Lestage et al. | |
| 8,548,872 B1 | 10/2013 | Gupta et al. | |
| 9,747,946 B2 * | 8/2017 | Groman | G11B 27/034 |
| 2007/0050831 A1 | 3/2007 | Thompson et al. | |
| 2009/0144811 A1 | 6/2009 | Matsubara et al. | |
| 2011/0197237 A1 | 8/2011 | Turner | |
| 2013/0239024 A1 | 9/2013 | Lewis et al. | |
| 2014/0108340 A1 | 4/2014 | Osher et al. | |
| 2014/0267749 A1 | 9/2014 | Frigon | |

* cited by examiner

Primary Examiner — Huy Thanh Nguyen

(57) ABSTRACT

A method for communication is described. The method includes providing a channel configured for collecting and editing video associated with a topic. The method includes identifying a plurality of potential parties connected with the topic. The method includes pushing a plurality of invitations to the plurality of potential parties, wherein each invitation comprises a request to join the channel. The method includes receiving a plurality of video feeds on the channel from a plurality of contributors each accepting a corresponding invitation. The method includes editing the plurality of video feeds to generate an edited video.

20 Claims, 12 Drawing Sheets

METHOD AND SYSTEM FOR SOURCING AND EDITING LIVE VIDEO

CROSS REFERENCE TO RELATED APPLICATIONS

The present application is a continuation of and claims priority to U.S. patent application Ser. No. 14/018,095 filed on Sep. 4, 2013, now U.S. Pat. No. 9,747,946, which claims priority to and the benefit of U.S. Provisional Patent Application No. 61/863,782, filed Aug. 8, 2013, under 35 U.S.C. § 119(e), entitled "METHOD AND SYSTEM FOR SOURCING AND EDITING LIVE VIDEO," the disclosures of which are herein incorporated by reference in their entirety.

BACKGROUND

Traditional non-professional methods for distributing information related to news worthy events involved a witness viewing the event, and generating content related to that event. Publication of that content could be through paper (e.g., newspaper, magazines, etc.), or through soft copies (e.g., blogging, texting, tweeting on Twitter, or other individualized communication methods). The initial distribution of content would be limited to a small number of viewers. Expanded distribution would occur after some time when a media (e.g., news, entertainment, etc.) editor picks up the original story for wider distribution across its own distribution network (e.g., media website, cable, television, twitter, etc.).

The above described method for reporting or distributing a story is characterized by a single feed broadcasted over a single channel, or a single user/single distribution channel. That is, one story is collected over a single feed, edited, and distributed to the public. Moreover, the video that is distributed is no longer live and is susceptible to becoming stale news.

It would be beneficial to distribute information about a news worthy event in real time.

SUMMARY

In embodiments of the present invention, a computer implemented method for communication is described. The method includes providing a channel configured for collecting and editing video, wherein the video is associated with a topic. The method includes receiving a plurality of video feeds on the channel, wherein the video feeds are each associated with the topic. The method includes editing the plurality of video feeds to generate an edited video for distribution.

In other embodiments of the present invention, a computer implemented method for communication is described. The method includes providing a channel configured for collecting and editing video, wherein the video is associated with a topic. The method includes identifying a plurality of potential parties connected with the topic, such as witnesses to a news worthy event. The method includes pushing a plurality of invitations to the plurality of potential parties. Each invitation includes a request to join the channel, wherein by joining a contributor streams live video back to the channel. The method includes receiving a plurality of video feeds on the channel from a plurality of contributors, each of which accepts a corresponding invitation. The method includes editing of the plurality of video feeds to generate an edited video including one of the following elements: live video, stored video, and additional content comprising stored video, and supplemental information (e.g., titles, overlays, information bars, static images, etc.).

In still other embodiments, a system for communication is described. The system includes a channel creation module configured to provide a channel used to collect and edit videos associated with a topic. The system includes an invitation module configured for identifying a plurality of potential parties connected with the topic and pushing a plurality of invitations to the plurality of potential parties. More specifically, each of the invitations includes a request to join the channel. The system also includes a collection module configured for receiving a plurality of video feeds on the channel from a plurality of contributors each accepting a corresponding invitation. The system includes an editing module configured for editing the plurality of video feeds and generating an edited video.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "capturing," "receiving," "sending," "collecting," "distributing," or the like, (e.g., in flow charts 500A and 500B of FIGS. 5A and 5B, respectively) refer to actions and processes of a computer system or similar electronic computing device or processor (e.g., system 100). The computer system or similar electronic computing device manipulates and transforms data represented as physical (electronic) quantities within the computer system memories, registers or other such information storage, transmission or display devices.

Figure 5A:
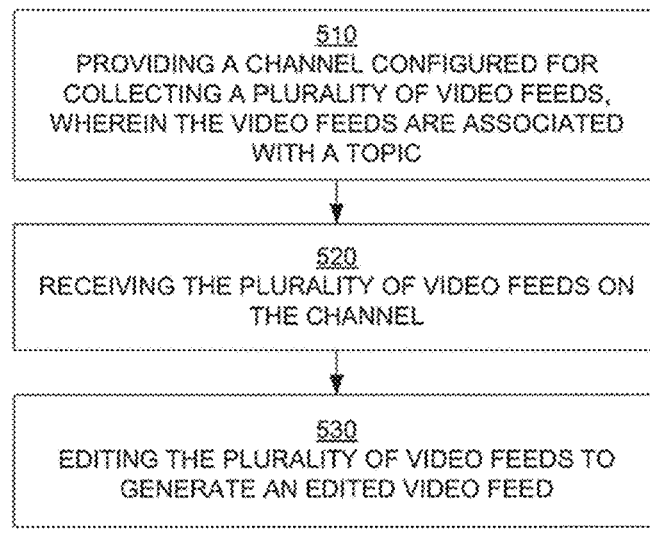
FIG. 5A is a flow diagram illustrating a method for sourcing, editing, distributing, and storing live video associated with a topic, in accordance with one embodiment of the present disclosure.
Figure 5B:
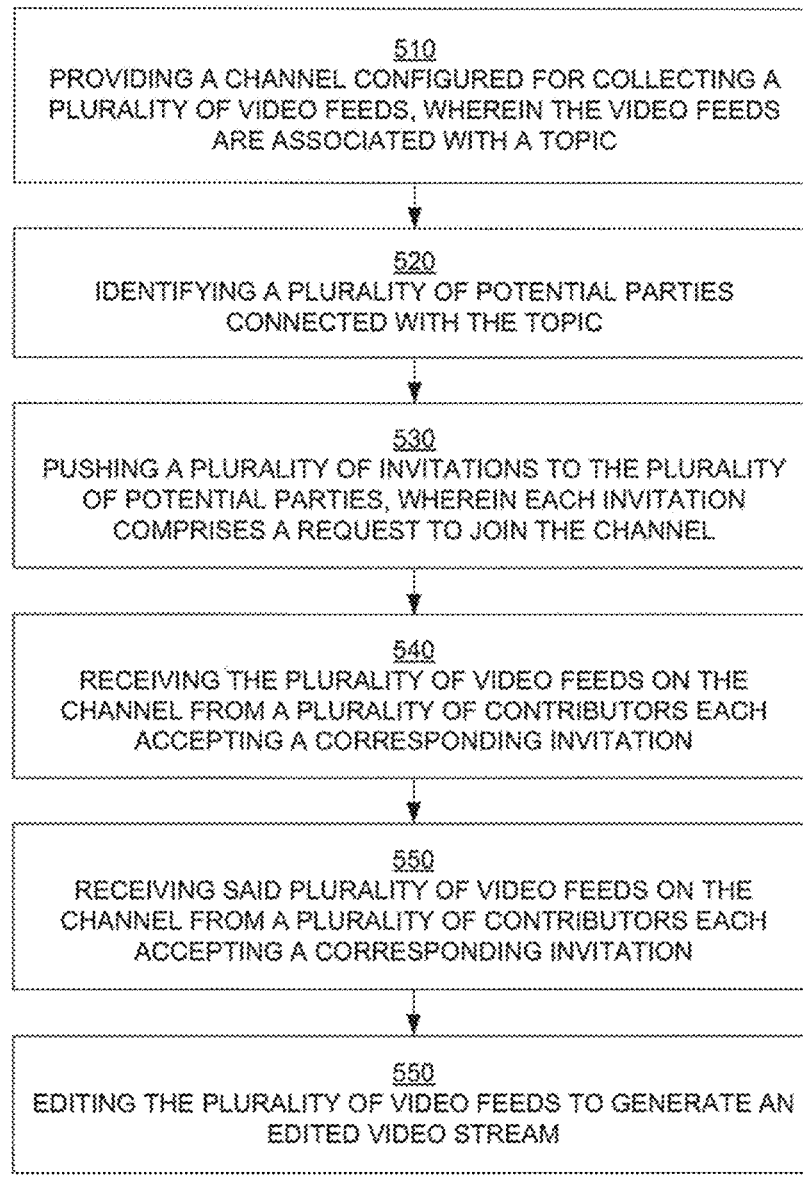
FIG. 5B is a flow diagram illustrating a computer implemented method for identifying potential sources of video, sending invitations to those sources to participate in a channel, and the editing of received videos for purposes of distribution and storage, in accordance with one embodiment of the present disclosure.

Throughout certain methods are discussed in relation to flow charts. For example, FIGS. 5A and 5B are flow charts of examples of computer-implemented methods for implementing the sourcing, editing, distributing, and storing of video feeds related to a topic (e.g., a live event or associated events, a political event, a mass event spread over a geographic area, a sporting event, a theme, etc.), according to one embodiment of the present invention. Although specific steps are disclosed in the flowchart, such steps are exemplary. That is, embodiments of the present invention are well-suited to performing various other steps or variations of the steps recited in the flowchart.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
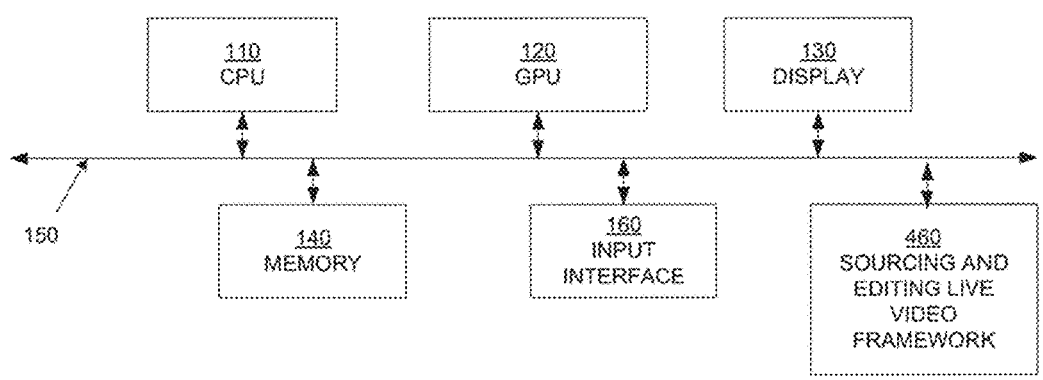
FIG. 1 depicts a block diagram of an exemplary computer system suitable for implementing the present methods, in accordance with one embodiment of the present disclosure.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data that drives a display screen 130.

The system 100 includes a user interface 160 that, in one implementation, includes an on-screen cursor control device. The user interface may include a keyboard, a mouse, and/or a touch screen device (a touchpad). System 100 also includes an access, sourcing, and editing module 460 that is configured for sourcing, editing, and distributing a plurality of video feeds. Module 460 is further described in FIG. 4 below.

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Accordingly, embodiments of the present invention provide for the shooting, requesting, directing, and storing of live video from multiple angles, wherein each video is associated with a particular topic. In that manner, contributors can capture live video from their handheld devices of a live event, stream the live video to a channel, wherein the host/editor controlling the channel can edit the live video (e.g., switch between live video feeds) to produce an edited video that includes a live streaming video taken from contributors witnessing the event. Other embodiments provide for the creation of a channel configured to collect live video from invited contributors. That is, contributors are invited to join and stream video (e.g., live or stored) to a channel, for example in one embodiment by sharing a channel key, or in another embodiment by pushing push requests to users participating in a third party social network (e.g., Twitter users). In still other embodiments, contributors start streaming video to the channel for example by following a uniform resource locator (URL) associated with the channel, such that the contributors are able to stream without needing to install a native application, or by selecting a menu item on a native application installed on their communication device. In still other embodiments, the channel creator is able to direct contributors through a communications interface (e.g., chat room, text, SMS, etc.), and switch between feeds to produce edited video for distribution.

Embodiments of the present invention are described within the context of capturing live video feeds associated with a topic, wherein the topic includes live events, related or associated events, occurrences tied to a theme, occurrences related to an affinity group having a shared interest or common goal. Other embodiments are well suited to capturing video that is not live, such as, stored video.

Figure 2:
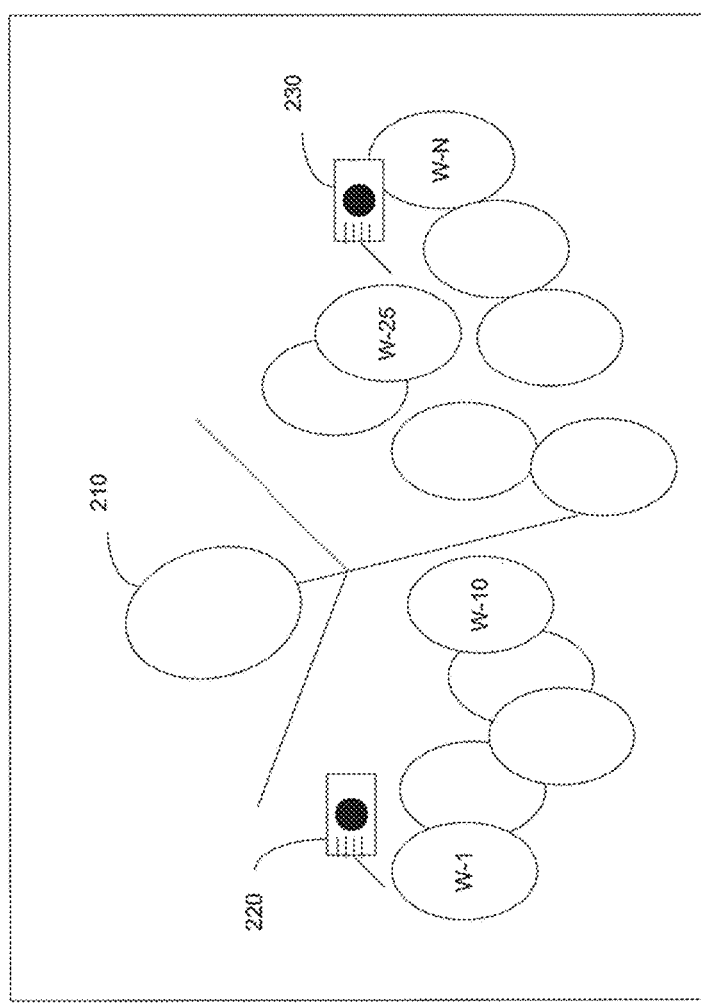
FIG. 2 is an illustration of witnesses capturing multiple viewpoints of a live event or associated events, in accordance with one embodiment of the present disclosure.

FIG. 2 is an illustration of potentially news worthy event, and witnesses who are present at the event and are associated with multiple viewpoints of the event, wherein the witnesses may become contributors to a channel streaming live video of the event, in accordance with one embodiment of the present disclosure. For example, related to events occurring in various Middle East countries around 2011-13, an Arab Spring event is occurring in Tahrir Square in downtown Cairo, Egypt. As shown in FIG. 2, multiple witnesses to the event are present at the event, such as witnesses 1-N, identified as W1-W-N. More particularly, some of the witnesses may be capturing live video on their smartphones of the event. As shown in FIG. 2, two witnesses (W-1 and W-25) are capturing live video of an individual 210 shown celebrating with outstretched arms. For instance, W-1 is capturing live video over device 220, and W-2 is capturing live video over device 230. These witnesses may be capturing video for personal use, or for later uploading to social networking site, or for streaming to a channel in accordance with embodiments of the present invention. Other witnesses may potentially start capturing live video when requested, as described in embodiments of the present invention. As such, one or more witnesses may capture and download videos to a distribution, editing and storage channel, in accordance with embodiments of the present invention.

More particularly, embodiments of the present invention provide for the invitation, production and editing of live video taken from multiple angles by pushing requests to those witnesses or persons related to a topic. The topic may include any event, or associated events. The topic may include occurrences relating to a theme that revolve around one or more events. The topic may include occurrences related to an affinity group, wherein the group is formed around a shared interest or goal.

For instance, videos related to a topic may include fans following Band-X on a cross-county tour. At a particular time and date, related videos may be taken by fans traveling to the next concert. As such, embodiments of the present invention are able to capture live video feeds at that time, aggregate those feeds, and provide a real-time glimpse into the lives of the fans that are scattered across the country but traveling to one destination. In another implementation, videos are collected for a casting or movie production. For instance, a topic may include one or more scenes from a movie generated through social networking. The collected video may follow a script known to the contributors of one or more scenes of the video. Once collected, the video is edited to include mixing and switching between the live videos to generate an edited video suitable for distribution on a viewing channel.

In embodiments, those witnesses capturing video may be requested to stream their video to a channel. Additionally, witnesses that are determined to be close to or present at the event, or persons identified as being related to the event or topic may be requested to start streaming video to the channel.

Embodiments of the present invention are configured to capture live video associated with a topic. For example, the live video may be captured by one or more witnesses of a live event (e.g., Tahrir Square demonstration), or of associated events, or the live video may follow a particular theme. The live video is then delivered to a channel by each of the contributors capturing the live video. For example, the video may be streamed to a channel, as accessed through a URL. In another example, the video may start streaming through a channel as facilitated by a native application that is loaded on the contributor's device. The captured video is edited, such as by mixing the live video, switching the live video, adding information to the live video, inserting stored video (e.g., instructional pieces) in between the live video feeds to generate an edited video. The edited video is distributed across a viewing channel, such that viewers are able to view the edited video. For instance, a channel creator is interested in capturing video from the Tahrir demonstration, and pushes requests to identified witnesses who are at or near the event, or somehow related to the event to participate in streaming live video of the event back to a channel.

Figure 3:
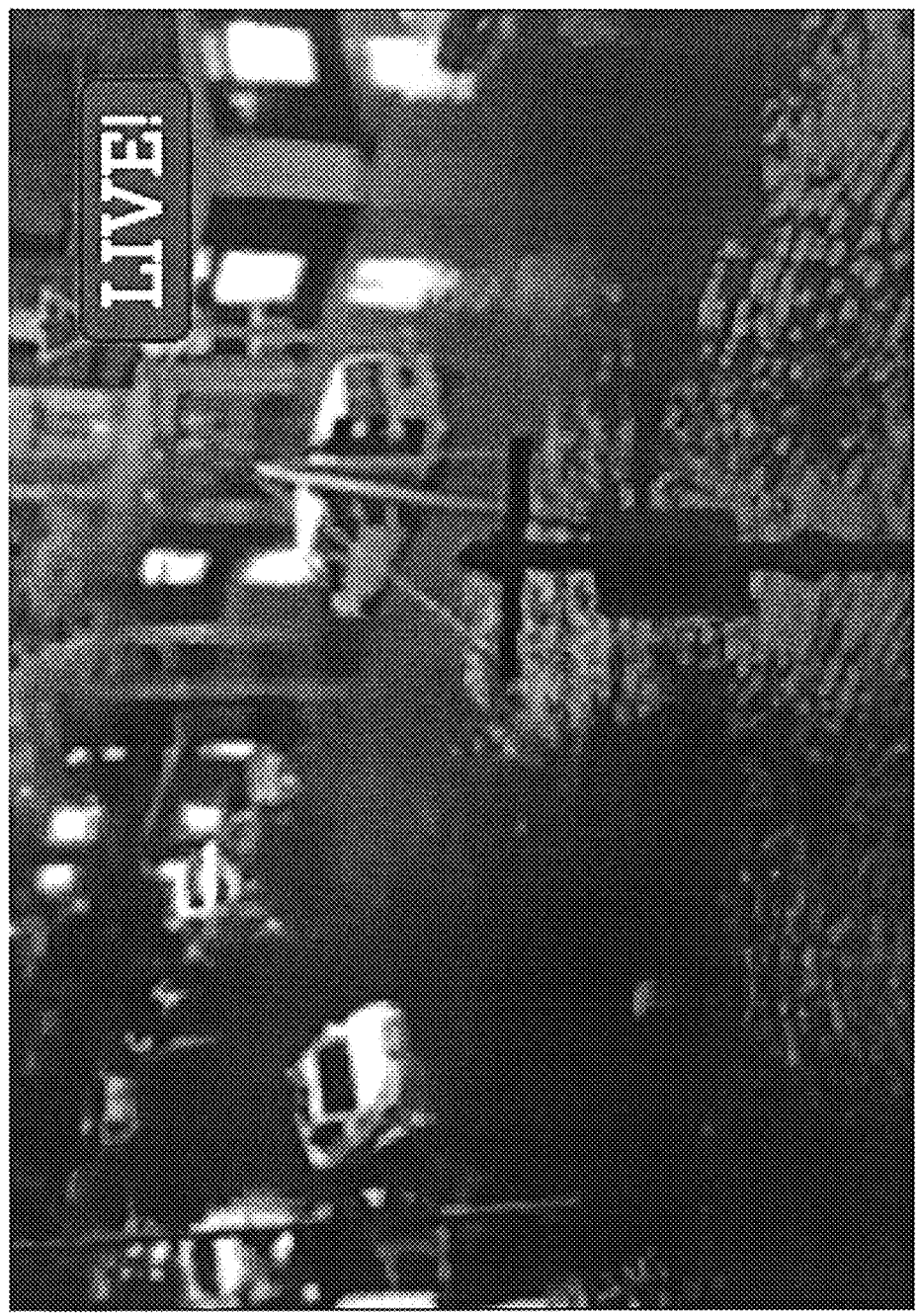
FIG. 3 is an illustration of a live video feed of an event available to the public over a media distribution channel, wherein the displayed video feed was selected from a plurality of video feeds collected over a channel and capturing different viewpoints of a live event or associated events, in accordance with one embodiment of the present disclosure.

Once a witness accepts an invitation to join a channel, that witness becomes a contributor to that channel. A contributor allows the channel creator to control their video capturing device, so that live video is streamed back to the channel for collection and further editing both during the event and after the event. That is, the contributor, as well as other contributors give up control over their corresponding media capturing devices (e.g., audio, video, images, graphics, 3D, 4D, etc.), such that corresponding live video is streamed to the channel over one or more communication and/or network interfaces. In one embodiment, a contributor streams live video by following a URL pointing to a web address. In another embodiment, a contributor streams live video by selecting a menu item in a native application present on his or her device. In still another embodiment, a contributor begins to stream live video by accepting a push or pushed request. In the particular case of using a URL, because the contributor communicates through their connection with a web site associated with a URL, the contributor does not need to install a native application, nor does the contributor have to set up an account with any third party service, nor does the contributor have to go through a verification of an account. In that manner, once the contributor is verified (e.g., presenting the proper channel identifier, has a proper third party handle, etc.), live video is streamed back to the channel FIG. 3 is an illustration of a live video feed of an event (e.g., flooding disaster) available to the public over a media distribution channel, wherein the displayed video feed was selected from a plurality of video feeds collected over a channel and capturing different viewpoints of a live event or associated events, in accordance with one embodiment of the present disclosure. Specifically, a host, channel creator, or editor of the channel is able to direct contributors through a communication interface (e.g., instant messaging, text, communication channel, chat, etc.). The communication interface may provide uni-directional or bi-directional communication, either through a one-to-one or one-to many configuration. In that manner, the channel creator is able to provide a particular contributor with specific instructions, such as, turn camera in a certain direction, capture an interview with another witness, zoom in, etc.). In one embodiment, the communication interface configured to provide instructions is included within the network interface collecting video feeds, and in another embodiment, the communication interface is separate from the network interface.

In addition, as the channel creator of the channel is aggregating live video feeds, the channel creator is also able to edit the live video feeds. In one embodiment, the channel creator is able to select one of the live video feeds for distribution. In another embodiment, the channel creator is able to switch between the live video feeds to create an edited video feed. In still another embodiment, the editor is able to perform further editing functions on the edited video feed. For instance, stored video is inserted before, after, or in between live video or other content. Further, in some implementations, the editing includes inserting additional content before, after, or in between live video or other content (e.g., supplemental information to include textual information, title, video feeds from third party sources, graphical images, etc. As such, the final, edited video is polished, and suitable for distribution. For instance, embodiments of the present invention are particularly suitable for sourcing, editing, distributing, and storing breaking stories (e.g., news, entertainment, sporting events, etc.).

In one implementation, the selected and edited video is provided as an embedded video that can be embedded in various media (e.g., web page, blog, image, frame, etc.) but hosted by a third party. In that manner, the embedded video (e.g., an in-line or i-frame) allows the edited video feed to be accessed through another document (e.g., website, blog, etc.). That is, the channel creator generates the edited video and is able to provide a link back to the edited video so that other users may use that edited video in their own content.

Figure 4:
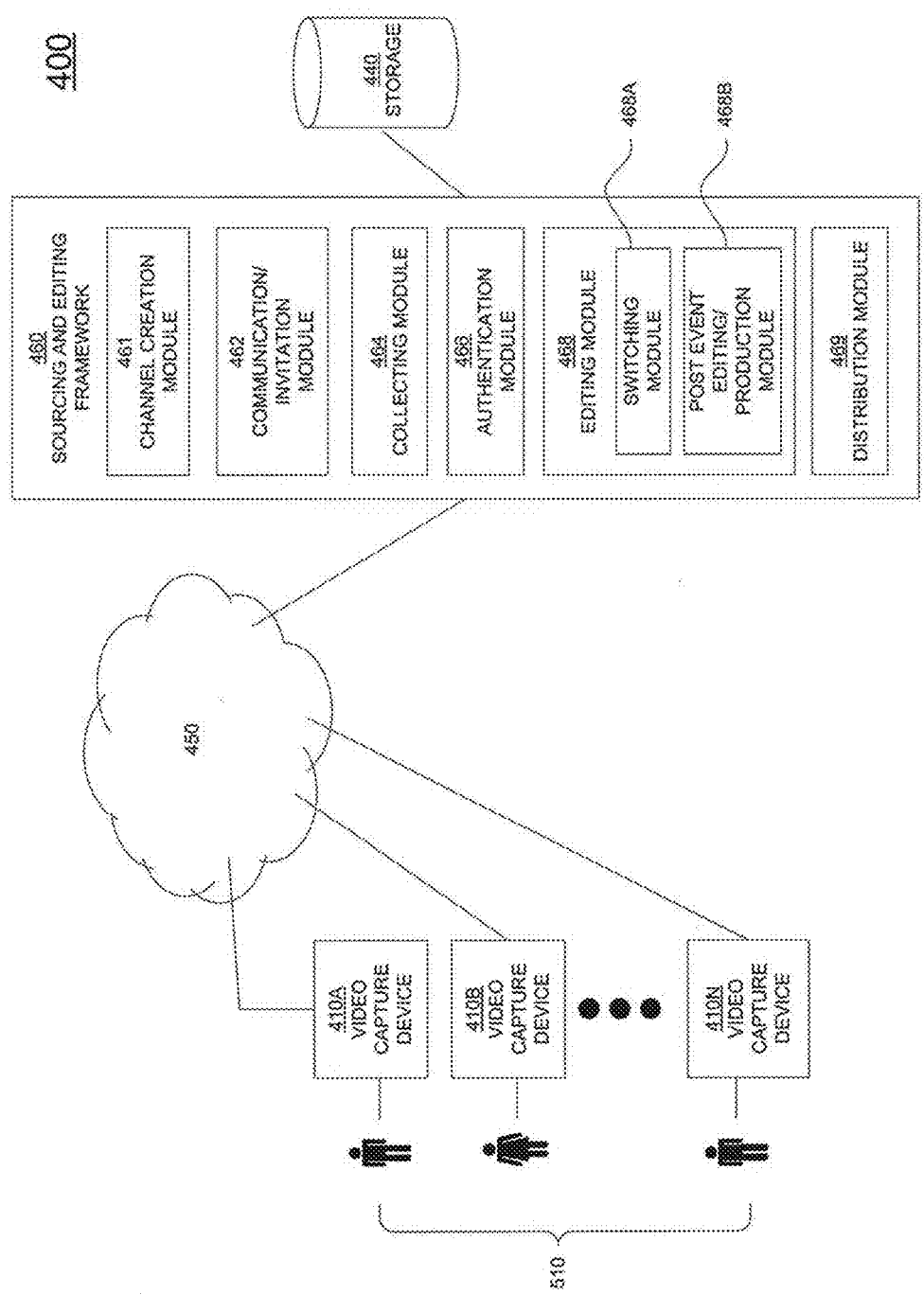
FIG. 4 is a diagram of a system configured for sourcing, editing, distributing, and storing live video associated with a topic (e.g., an event or associated events), in accordance with one embodiment of the present disclosure.

FIG. 4 is a diagram of a system 400 configured for sourcing, editing, distributing, and storing live video of an event or associated events, in accordance with one embodiment of the present disclosure. As shown, a plurality of video feeds is captured by a plurality of video capturing devices 410 (e.g., 410A-N). Each of the video capturing devices is associated with a contributor (e.g., user or witness) that is associated with a corresponding video capturing device. For instance, at an event (e.g., live event), associated events, or events tied by a theme, multiple contributors have the capability of capturing live video (e.g., through their associated smartphones). Embodiments of the present invention are capable of leveraging the plurality of live videos to generate an edited video suitable for distribution. For example, system 400 is capable of capturing multiple angles and viewpoints of videos related to a topic (e.g., videos of a particular event, such as Arab Spring uprising, political event, sporting event, etc.), collect them for filtering, direct the capturing of the video content, edit the captured and streamed video to generate a polished video product, distribute the edited video, and store the edited video as well as the collected video feeds. As such, embodiments provide an editing tool for a channel creator to generate the edited video and/or edited video, and also provide for a distribution channel by which viewers are able to view the edited video, rather than trying to sift through the hundreds and thousands of video feeds randomly capturing the event. That is, embodiments of the present invention collates the multiple video feeds (live or stored) that are available through one or more distribution services and/or platforms (e.g., Twitter, Facebook, YouTube, internet, texting, a contributor to the channel, etc.).

In one embodiment, contributors provide live video associated with a topic back to a channel. The contributors are identified as being related to the topic. For instance, a contributor satisfies at least one criteria that is related to the topic. As an example, a criteria may include a geographic area of interest. As such, a potential party is identified as being within the geographic area of interest, and as such an invitation to join the channel is delivered to that potential party. Upon acceptance, the potential party becomes a contributor, and begins to stream live video back to the channel. In another example, a criteria may include determining that a potential party has delivered a communication that is related to the topic. As such, an invitation to join the channel is also delivered to the party making that communication. Other criteria is contemplate and supported by embodiments of the present invention.

The contributors stream their live video to a back-end server 460 through a communication network 450 (e.g., internet, telephone network, mobile phone network, or a combination, etc.). The back-end server 460 provides a framework for the sourcing and editing of the video feeds (e.g., live). For instance, the sourcing and editing framework 460 includes a channel creation module 461 that is configured for providing a channel used to collect and edit videos associated with a topic, wherein the topic includes an event or related events, occurrences related to a theme, occurrences related to an affinity group, etc., as previously described. The framework 460 includes a communication/invitation module 462 that is configured for inviting potential witnesses to become contributors to the channel. In particular, the invitation module is configured for identifying a plurality of potential parties connected with the topic and pushing a plurality of invitations to the plurality of potential parties. Each of the invitations comprises a request to join and stream live video back to the channel. Framework 460 also includes a collecting module 464 configured for the collection of the live video feeds from each of the contributors. That is, the collecting module 464 is configured for receiving a plurality of video feeds on the channel from a plurality of contributors, wherein each contributor accepts a corresponding invitation.

Framework 460 also includes an authentication module 466 for authenticating the contributors and/or live video feeds. For example, in one implementation the authentication module 466 is able to authenticate a contributor through a third party source (such as, through a Twitter account). In another implementation, another layer of authentication is provided by verifying that the location of the contributor matches or is near the location of a particular event. In still another implementation, another layer of authentication is provided by verifying that the captured video is related to other video previously verified to be capturing images of the event. Additional human based authentication is provided by the editor or channel creator through the selection of a contributor's video feed for distribution.

Framework 460 also includes an editing module 468 configured for editing of the plurality of captured and streamed feed, and generating an edited video. In still other embodiments, editing module 468 is configured to edit and generate any type of media content, such that the final product includes portions comprising one or more media formats. Editing may include the selection of one or more live or stored video feeds in sequential order. This includes mixing and/or switching between live video feeds. For instance, the switching module 468A is configured to mix and/or switch live video feeds so that a live video feed is inserted before, after, or in between live video and/or additional content. In addition, editing may include injecting additional content before, after, or in between the live video and/or other content. For instance, the additional content includes maps, images, title screen, other informational images, textual information, overlaid information, and/or additional information.

The editing module 468 includes a post event editing/production module 468B that is configured for providing access to the plurality of video feeds and the final, edited video that are stored. In this manner, post-production editing may be performed on the stored video for purposes of generating a second media project suitable for personal use or for distribution.

Framework 460 also includes a distribution module 469 configured for distributing the edited video to the public (e.g., through an i-frame, through a web site, through a broadcasting channel, through a viewing channel, etc.). For instance, a viewing channel may be established in relation to the contribution/editing channel for the distribution of the final, edited video to interested viewers. Additionally, the captured live feeds from the video capturing devices 410, as well as the edited video suitable for distribution are stored in storage 440.

FIG. 5A is a flow diagram 500A illustrating a computer implemented method for sourcing, editing, storing, and distributing live video related to a topic, in accordance with one embodiment of the invention. In another embodiment, flow diagram 500A is implemented within a computer system including a processor and memory coupled to the processor and having stored therein instructions that, if executed by the computer system causes the system to execute a method for sourcing, editing, storing, and distributing live video related to a topic. In still another embodiment, instructions for performing a method are stored on a non-transitory computer-readable storage medium having computer-executable instructions for causing a computer system to perform a method for sourcing, editing, storing, and distributing live video related to a topic. The method outlined in flow diagram 500A is implementable by one or more components of the computer system 100 and system 400, including the storing and editing module 460.

At 510, the method includes providing a channel configured for collecting a plurality of video feeds, wherein the video feeds are associated with a topic. For instance, the plurality of video feeds are related by an event, such as, a demonstration, sporting event, performance, or any event that is of interest to the channel creator and/or viewers. The plurality of video feeds may be associated with one or more associated events, or to events related by a theme, or a theme associated with an affinity group formed around a shared interest or common goal. For instance, the video feeds may be associated with an affinity group centered on fans of Band-X. The video feeds may be capturing occurrences of those fans at various tour events as they follow Band-X on their cross-country tour. In another instance, the video feeds may be associated with a planned script or casting, such that the channel creator is capturing video feeds that are to be used in a short movie script or clip.

At 520, the method includes receiving the plurality of video feeds on the channel. As previously described, once the contributors join, their video feeds are streamed to the channel, for example by following a URL, or through an communication interface established by a native application, etc.

At 530, the method includes editing the plurality of video feeds to generate an edited video feed. Any number of editing processes may be performed. For instance, a sequence of videos, including one or more portions of the plurality of live video feeds, is generated to be included as an edited video suitable for distribution. Further, additional content or material may be provided in association with the video feeds, such as, overlays, titles, stored video, static images, graphics, dynamic graphics, maps, images, other video feeds provided over third party media and distribution platforms, etc. This additional material may be stored information available for inclusion in the edited video. Still other independent material may also be provided, such as, introductory or explanatory video (e.g., stored video) that is joined with the edited videos. As a result, the final, edited video includes one or more of the following: portions of live video feeds, portions of stored video feeds, additional content, etc.

In another embodiment, the collected video (e.g., live or stored) and final, edited video are stored. This stored information may be further edited in a post-event editing/production process (e.g., using the editing module 468 of FIG. 4) to generate a second edited video or media project.

FIG. 5B is a flow diagram 500B illustrating a computer implemented method for identifying potential sources of video, sending invitations to those sources to participate in a channel, and the editing of received videos for purposes of distribution and storage, in accordance with one embodiment of the present disclosure. In another embodiment, flow diagram 500B is implemented within a computer system including a processor and memory coupled to the processor and having stored therein instructions that, if executed by the computer system causes the system to execute a method for identifying potential sources of video, sending invitations to those sources to participate in a channel, and the editing of received videos for purposes of distribution and storage.

In still another embodiment, instructions for performing a method are stored on a non-transitory computer-readable storage medium having computer-executable instructions for causing a computer system to perform a method for identifying potential sources of video, sending invitations to those sources to participate in a channel, and the editing of received videos for purposes of distribution and storage. The method outlined in flow diagram 500B is implementable by one or more components of the computer system 100 and system 400, including the storing and editing module 460.

At 510, the method includes providing a channel configured for collecting a plurality of video feeds associated with a topic. The channel is implemented through a URL in one embodiment, and allows for the aggregation and collection of a plurality of video feeds from disparate sources and varying formats. In one embodiment, the video feeds are transformed into a uniform format suitable for editing. As previously described, the topic may include any related video feeds, such as, events, related events, occurrences related to theme, occurrences related to an affinity group, etc.

At 520, the method includes identifying a plurality of potential parties connected with the topic. Embodiments of the present invention are well suited to providing automated filtering of the selection of witnesses as potential contributors. For instance, witnesses that are delivered a request to join a channel may be selected based on various filtering criteria. In particular, parties who are related to or have some connection to the topic are identified as potential parties who want to join and stream live video back to the channel. For example, many witnesses may be present at a news worth event. Those witnesses may be identified as being at the event through many methodologies, such as, in one embodiment, the identified parties satisfies a criteria. As examples, a filter criteria may be geo-location, where a particular event is occurring at location-X and the channel creator seeks for individuals who are known to be at or near location-X. Based on the filter criteria, those individuals are then selected to have a request delivered to join the channel.

For instance, a user of a social networking site providing for streaming of video feeds to channels may constantly update his or her location to a central server of the social network. As such, the social network may inform a channel creator whose topic is related to events or an event within a geographic area (e.g., 1 mile within Tahrir Square) that a potential party is within that geographic area. In another instance, the criteria may be a person who is identified as having an affinity for or an interest in a topic (e.g., fan of Band X) based on user profile data collected through one or multiple sources (e.g., social network user profile, data mining profile, etc.). In another implementation, a party may be identified as having delivered a message (e.g., through a networking platform, such as, Twitter) related to the topic or event. As an example, a party may be sending live text messages on a blog relating the events at Tahrir Square, that are of interest to the channel creator. In still other implementations, one or more criteria must be satisfied to be identified as a potential party.

At 530, the method includes pushing a plurality of invitations to the plurality of potential parties. Each of the invitations includes a request to join and stream live video to the channel. For instance, the invitation may be through a text message, third party messaging platform, direct phone call, email, or any suitable message format capable of delivering a request to join.

In one embodiment, the request includes a link back to the URL of the contribution channel. When activated, the potential party is communicatively coupled to the URL without having a native application installed on their corresponding device. In that manner, joining the channel and streaming live video back to the channel is accomplished without use of the native application. In another embodiment, the request is handled by a native application. As such, the potential party has a native application installed on his or her mobile device that is configured to recognize the request to join the channel, and to facilitate that joining. In one implementation, the native application is executed in combination with a network interface (e.g., internet, phone network, data network, etc.) to provide for communication back to the channel, which may be configured as a web page, or data node, etc.

At 540, the method includes receiving the plurality of video feeds on the channel from a plurality of contributors each accepting a corresponding invitation. Specifically, focusing on one potential party, the method includes receiving from a first device an acceptance of a first request to join. The acceptance is associated with a potential party that is now a contributor, and is referred to as the first contributor.

In one embodiment, the method includes authenticating the potential party as the first contributor. For instance, various layers may be implemented for authenticating a contributor. At a first layer, the joining party must correctly provide a channel identifier. Only after providing the correct identifier is the contributor authenticated. At another layer, the authentication is performed through a third party, such as, a third party social networking site. For example, a contributor may be identified as having a Twitter account, and as such, authentication is performed by verifying the authenticity of the Twitter account. At still another layer, once the video feed is being streamed, the content of that video stream may be compared against other verified content. If the content matches or is within the same scope (e.g., geographic area, on topic, etc.), then the contributor is authenticated. On the other hand, if the content does not match, then the contributor is not authenticated.

Once authentication is successfully achieved, a request is delivered to the device of the potential party as the first contributor. That is a request may be delivered from the channel creator side to the device associated with the first contributor, wherein permission to take control of the media capturing module within the device is requested. Once the request is accepted, the media capturing module is instructed to begin capturing video and to stream it back to the channel, through whatever communication link is established between the device and the channel. At that point, the live video delivered by the device is received back at the channel for purposes of editing and storage.

In one embodiment, when authentication is not successful, the associated video feed is dropped. For instance, the first contributor may have satisfied initial layers of authentication to join the channel and begin streaming live video. However, another layer of authentication may discover that the live video is off topic, and as such, the contributor is no longer authenticated. In that case, the corresponding video feed is dropped from the channel.

At 550, the method includes editing the plurality of video feeds to generate an edited video. As previously described, the edited video may include one or more elements, including portions of live video, portions of stored video, and additional content, such as, text, information, graphics, maps, title pages, instructional video, replayed video previously captured, etc.

For instance, the editing of video includes switching from a first video feed to a second video feed. In one instance, the first and/or second video feed comprises live video. In another instance, the first and/or second video feed comprises stored video. In still another instance, the first and/or second video feed comprises additional content, as previously described, such as, information, maps, titles, supplemental information, video obtained from a third party platform, etc.

In addition, automated editing of the channels may be performed, in one embodiment. For instance, one video stream may be preferred over another video stream based on selection criteria, including: strength of communication signal, quality of video, quality of audio, reputation of the contributor, which contributor has been previously selected, which contributor is associated with a better video capturing device, etc.

The method includes providing a viewing channel for distribution of the final, edited stream. That is, the created channel includes a pair of channels, including a contributor channel and a viewing channel. The contributor channel is configured for the sourcing, editing, and storing of live video feeds. The viewing channel is configured for viewers to access and/or view the live video feed. Access may include using the stored material in such a manner to create another edited video project that comprises portions of the final, edited video, and the live video that was collected and stored.

As such, over the distribution channel, the final, edited video is then distributed to the public or viewing audience. For instance, in one implementation, the edited video is provided as an embedded video or frame (e.g., i-frame) for further distribution. For instance, an embedded link or tag may be included within third party content. As such, the method includes receiving a request to access the edited video via a link or tag that is embedded within web content, for example. The edited video is delivered to the requester for inclusion within or in conjunction with the web content. Still other embodiments provide for distribution of the edited video through broadcast channels, on web sites, or through any distribution channel.

In one embodiment, the distribution is controlled. For instance, the edited video may be distributed to one distribution channel given exclusive rights (e.g., on a news worthy breaking story). On the other hand, popular media may be distributed across multiple distribution channels so that the brand may be widely distributed.

Figure 6:
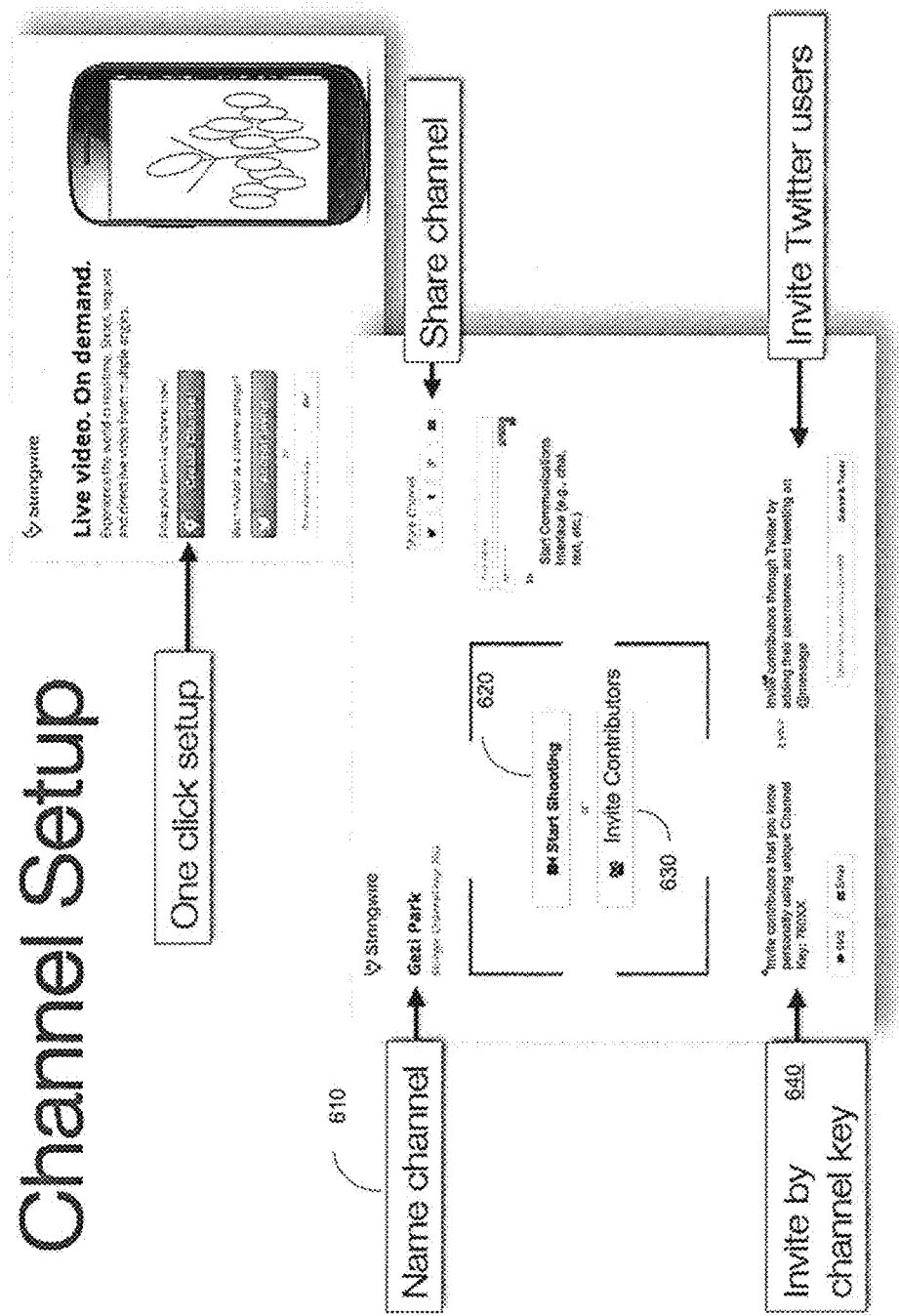
FIG. 6 is an illustration of the process for setting up a channel configured for sourcing, editing, and distributing live video of an event or associated events, in accordance with one embodiment of the present disclosure.
Figure 7:
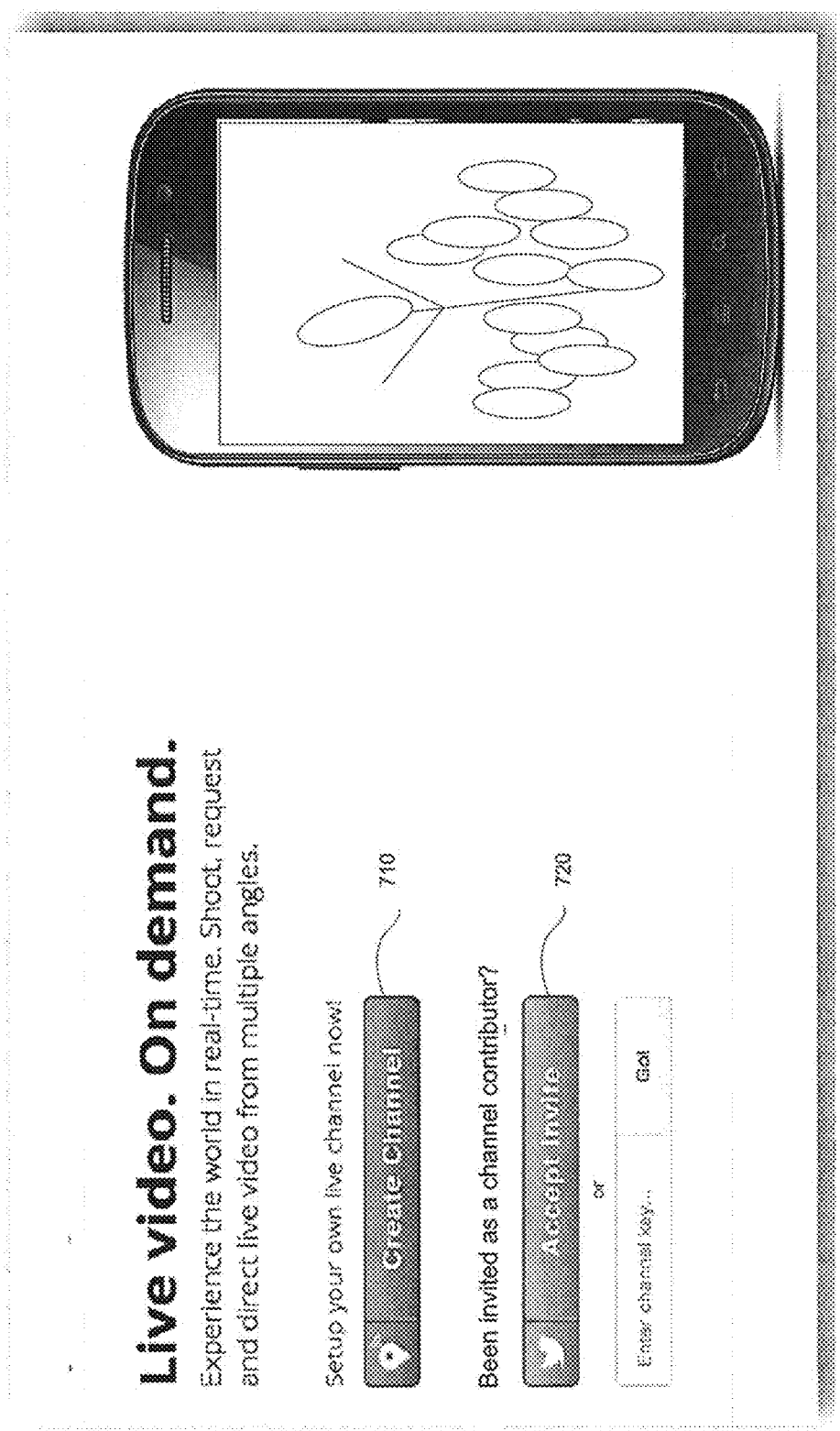
FIG. 7 is an illustration of the process used for a contributor to join a channel, wherein the channel provides the framework for the sourcing, editing, and distribution of multiple live video feeds of an event or associated events.

FIG. 6 is an illustration of the process for setting up a channel configured for sourcing, editing, and distributing live video of an event or associated events, in accordance with one embodiment of the present disclosure. As shown, a "one-click setup" is provided in one implementation, wherein the channel creator is able to quickly crate and title a channel (e.g., Gezi Park), as identified by block 610. FIG. 7 provides an interface allowing a channel creator to being the process of creating a channel by activating the "create channel" interface 710, as implemented through FIG. 6.

Once the channel is created, the channel creator is able to either contribute directly to the channel with video content by activating interface block 620, or invite other contributors via interface block 630. For instance, a potential video feed is identified by a channel creator or through automated filtering, wherein the video feed is related to the topic and is associated with a potential first contributor. A request is pushed to the first contributor to join the channel to send an invitation to join the channel, as implemented by blocks 640 and 650. An acceptance of the request is received, and a request for authorization to capture and control the live video associated with the first contributor is sent to the device associated with the first contributor. Thereafter, the live video feed is received from the device associated with the first contributor over the channel.

In one embodiment, the invitation is provided by inviting third party social media users through block 650, such as, Twitter users. As an example, the channel creator provides Twitter information related to a Twitter user identified for joining, and an @message is delivered to the user requesting him or her to join the channel. The @message includes a link back to the back-end server supporting the channel. That link is used to join the channel. In that manner, those electing to join may be authenticated using corresponding social media. For instance, if a Twitter user decides to join the channel, embodiments of the present invention are able to leverage the authentication mechanisms of the Twitter servers to authenticate the joining contributor.

In another embodiment, the channel is given an identifier or key, such as, key 760XX. The channel creator may give the channel key to another individual in a request to join. That individual would then go to the channel to register (e.g., through a link), and present the channel key upon registration as a manner of authentication.

For instance, FIG. 7 is an illustration of the process used for a contributor to join a channel, wherein the channel provides the framework for the sourcing, editing, and distribution of multiple live video feeds of an event or associated events. As shown, the interface 700 is presented to the potential party wishing to join the channel as a contributor. In one implementation, the potential party, through a link is brought to the back-end server supporting one or more channels. The potential party is asked whether or not he or she wants to accept the invitation by clicking on the "Accept Invite" button, if the party is part of a social network, which may also provide authentication of the party. On the other hand, the party is able to enter in a corresponding a channel key, as previously described.

The channel creator is able to source and edit multiple video feeds. Thereafter, the edited content may be shared. For example, FIG. 8 is an illustration of multiple live video streams or feeds from contributors viewing a live event or associated events, and the selection of one of the feeds for distribution in a dashboard interface used by the channel creator, in accordance with one embodiment of the present disclosure.

Figure 8:
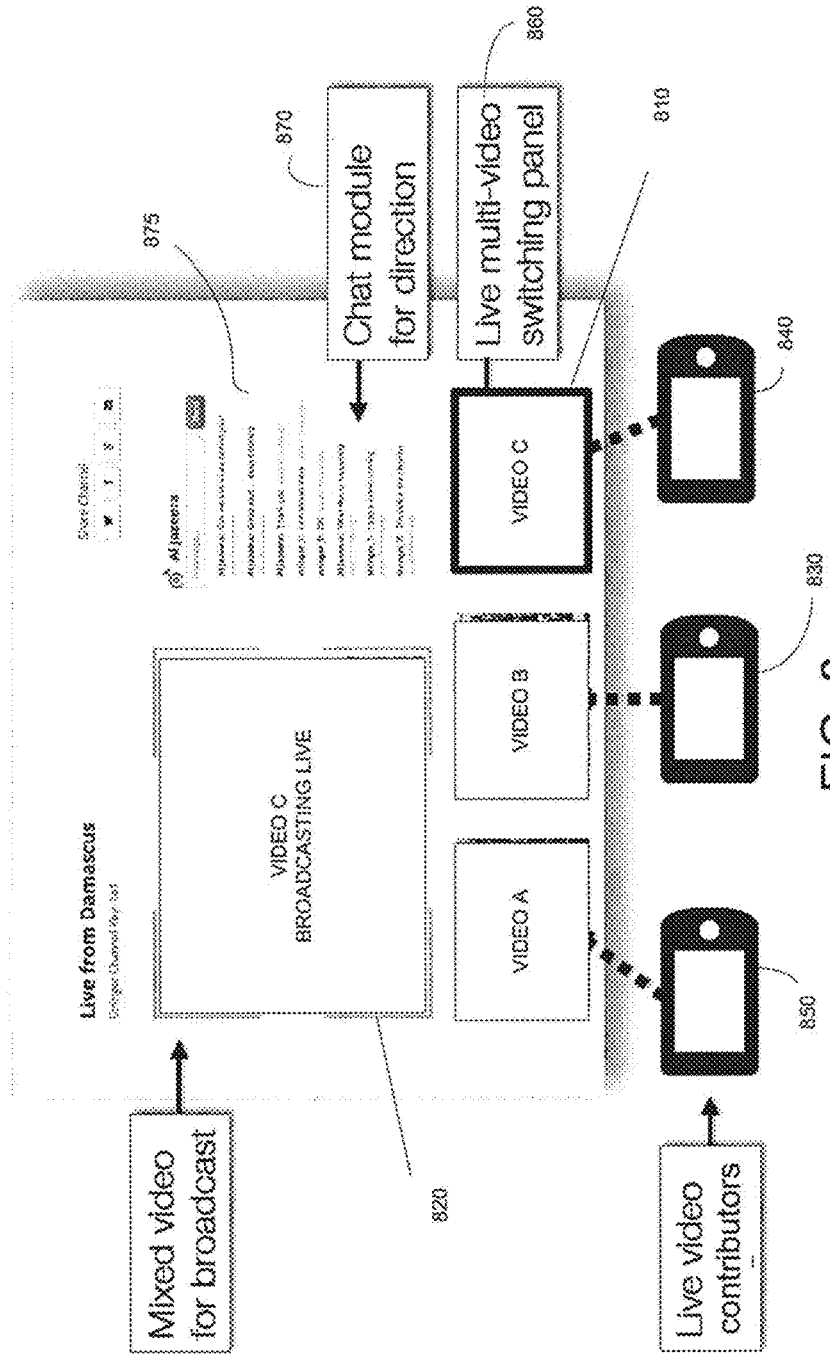
FIG. 8 is an illustration of multiple live video streams or feeds from contributors viewing a live event or associated events, and the selection of one of the feeds for distribution, in accordance with one embodiment of the present disclosure.

As shown in FIG. 8, one or more live video feeds are provided by contributors to the corresponding channel (e.g., "Live from Damascus"). For instance, three contributors, each streaming live video, are participating in the channel.

The live video feed 810 is selected for prominent display over the channel to the public. A live switching highlight panel is used so that the channel creator knows which feed is currently selected for distribution. That is, video feed 810 is provided in the window 820 suitable for broadcast. In addition, other information may be provided to generate an edited, and mixed video suitable for broadcast or distribution.

Also shown in FIG. 8 is a communication interface 800 (e.g., chat window, video and audio interface, text, SMS, etc.). The communication interface 800 is used by the channel creator to provide instructions to each of the contributors, either collectively in one or more groups, or individually. In addition, in embodiments, the communication interface may provide one-way, two-way, or multi-way communication between the channel creator and each of the contributors. Additionally, the communication interface may be configured as a one-to-many interface or a more private one-to-one interface.

For instance, as shown in FIG. 8, three contributors are contributing live video. A first contributor is streaming a live video feed A via device 850 back to the channel. A second contributor is streaming a live video feed B via device 830 back to the channel. Also, a third contributor is streaming a live video feed C via device 840 back to the channel.

An editing panel, or switching panel 860 is provided in interface 800 that is configured to switch between any of the videos streamed to the channel. At this particular moment in time, video C is selected as the streaming live video contained within the edited video. As such, at that particular moment in time, if the edited video is viewed, that viewer would see video C. Window 820 shows the edited video comparing video C at that particular moment in time.

In addition, window 875 illustrates a communication channel between the channel creator and one or more contributors. As indicated in block 870, window 875 includes a chat module for providing directions to the contributors (e.g., move camera view to the left for contributor 1, etc.). The communication channel includes any suitable means for communicating direction, and may be comprised of one or more components, such as, audio, video, text, etc.

Figure 9:
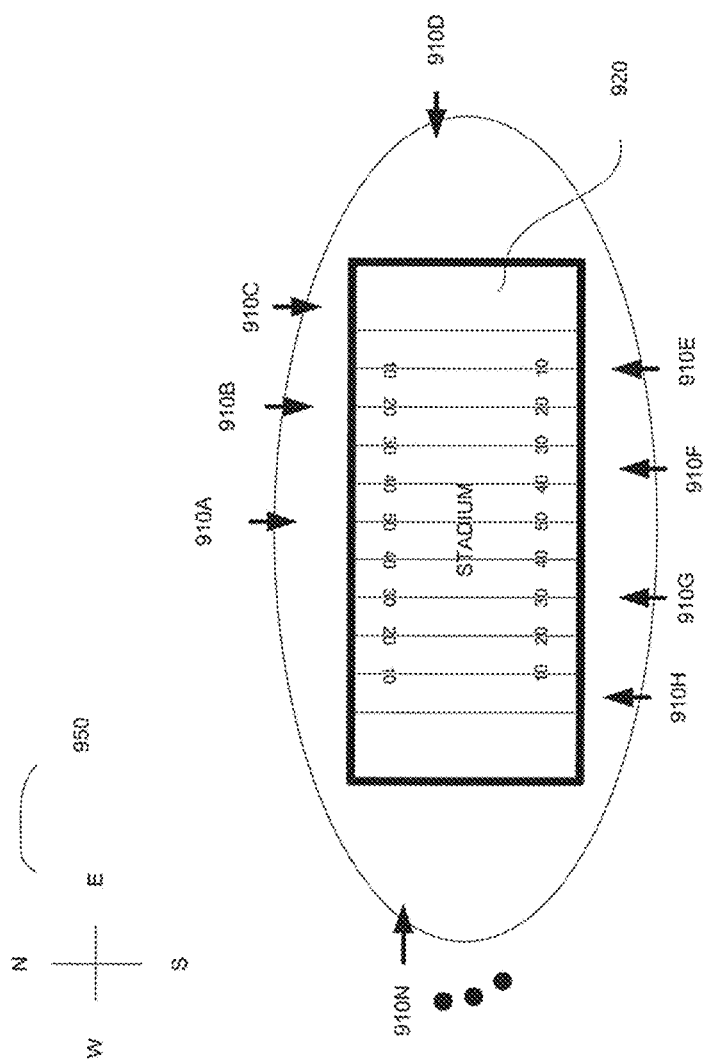
FIG. 9 is an illustration of multiple witnesses to a single, live event and the sourcing, editing, and distribution of the live video feeds of contributing witnesses, in accordance with one embodiment of the present disclosure.

FIG. 9 is an illustration of multiple witnesses to a single, live event and the sourcing, editing, distribution, and storing of the live video feeds of contributing witnesses, in accordance with one embodiment of the present disclosure. The use case provided in FIG. 9 is for illustration purposes only. As shown in FIG. 9, an event includes a football game (e.g., college football game) that is viewed by an audience. One or more attendees are identified as potential parties (e.g., an affinity group) possibly interested in joining a channel that is distributing fan viewpoints of a football game. A channel creator may have requested that certain attendees join a channel. For instance, the contributors 910A-N have joined the channel. The contributors may have been selected because their geographic location matches that of the stadium.

The channel creator may select between the live video feeds 910A-N based on where the action of the game is. For instance, if the play of the game is concentrated in the end zone 920, then the channel creator or filtering criteria may select video feed 910D as the one that is being shown to the public over the channel.

In another embodiment, crowd sourcing is used to collect and filter out the one or more live video feeds to generate an edited video suitable for distribution. That is, crowd sourcing is used to determine the sourcing of contributors and/or the editing between different contributor content. For example, crowd sourcing may be used to identify which live video feeds are collected in a channel, in relation to an event, associated events, or events related to a theme. The crowd sourcing may be all members of the channel creation service, or one or more third party social media services. The identification may be performed using filter criteria on metadata associated with each of the collected live video streams. Thereafter, crowd sourcing may be utilized for determining which editing processes are then used to generate the edited video suitable for distribution. As an example, up-voting between each of the contributed video feeds is used for ranking. In the scenario posed by FIG. 9, wherein different contributors are capturing video feeds of a football game, the crowd sourcing may determine that one of the video feeds is particularly interesting (e.g., showing a dancing mascot, or continuously showing the opposing team members at various points in the game). As such, crowd sourcing may be used to further select and filter between the plurality of video feeds provided by the contributors, so that one video feed is selected at one time, another video feed is selected at another time, etc. to generate an edited video feed suitable for distribution.

In another embodiment, crowd sourcing is implemented to determine sourcing of contributors.

Figure 10:
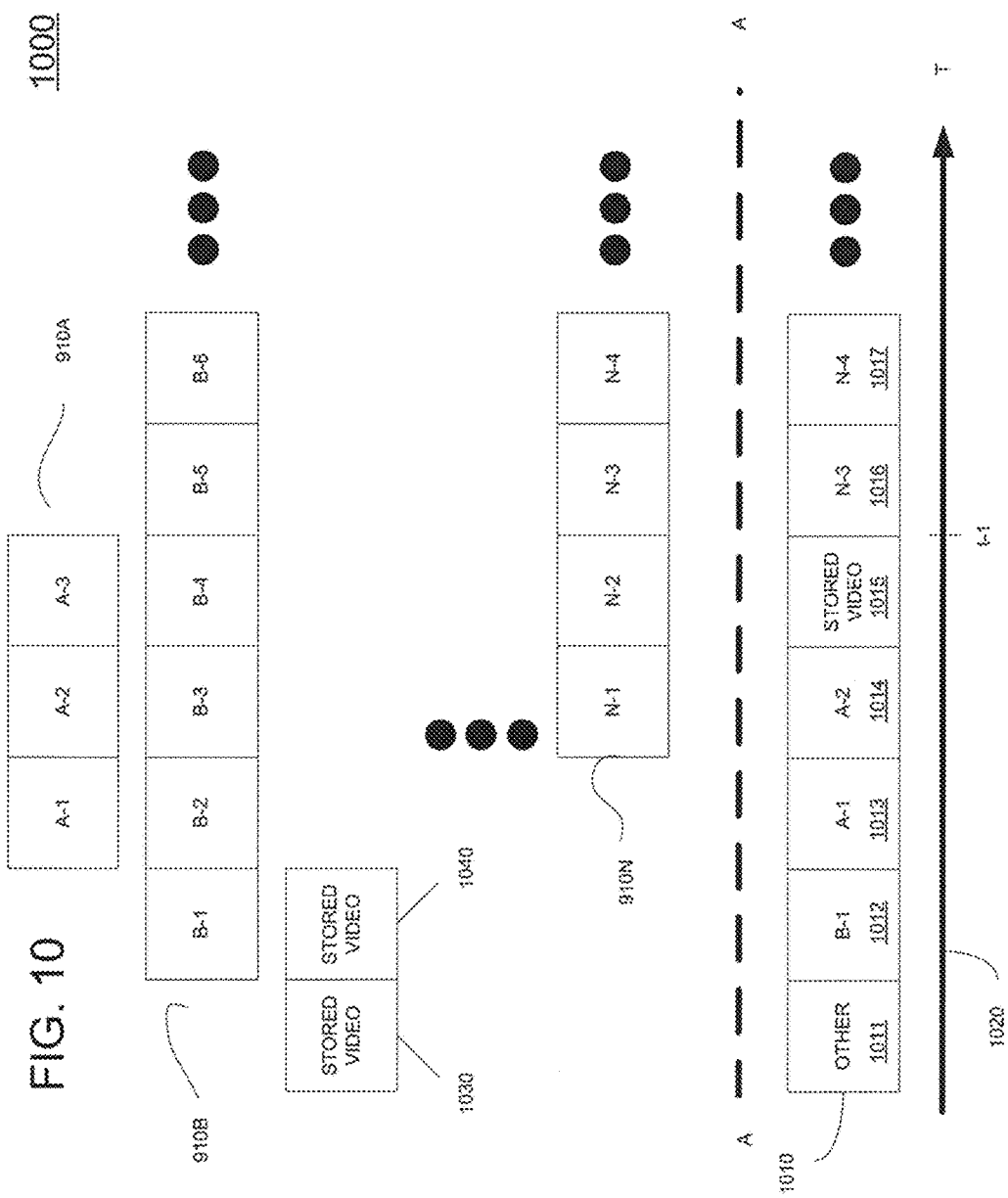
FIG. 10 is an illustration of a plurality of live and stored video feeds that is edited to generate an edited video, in accordance with one embodiment of the invention.

FIG. 10 is an information flow diagram 1000 illustrating a plurality of live and stored video feeds that is edited to generate an edited video, in accordance with one embodiment of the invention. For instance, above line A-A, live video streams 910A, 910B, and 910N are shown. In addition, the live video streams are collected by the channel at different start and possibly stop times. For instance, according to time line 1020, live video feed 910A (e.g., A-1, A-2, and A-3) is started after live video feed 910B (e.g., B-1 . . . B-N). In addition, live video feed A may stop at time t-1, whereas live video feed 910B does not end for a considerable amount of time. In addition, live video feed 910N (e.g., N-1 . . . N-N) also begins after video feeds 910A and 910B. Video feeds 910A, 910B and 910N are captured by attendees of the college football game, first introduced in FIG. 9. Additionally, stored video 1030 and 1040 may be available to the channel.

Also shown in FIG. 10 is the edited video 1010 that is streamed. The edited video includes live video, stored video, and additional or other content. For instance, in the first sequence block, supplemental content is included, such as, a title page, or introductory video, which may be stored video 1030. In the second sequence block 1012, video B-1 from video feed 910B is switched for inclusion. The third sequence block 1013 includes video A-1, and the fourth sequence block 1014 includes video A-2. The fifth sequence block includes stored video 1015, which may be stored video 1030 or stored video 1040, or contain other content. In one embodiment, the stored video is a replay of previously captured video (e.g., video stream A-2). For instance, video stream A-2 is selected to stream live video of the game when a touchdown occurs. The sixth sequence block includes video N-3, and the seventh sequence block includes video N-4.

The stored video in sequence block 1015 may comprise a replay sequence of video stream A-2, such as, the last 30 seconds, so that the touchdown play is replayed to the viewers.

Figure 11:
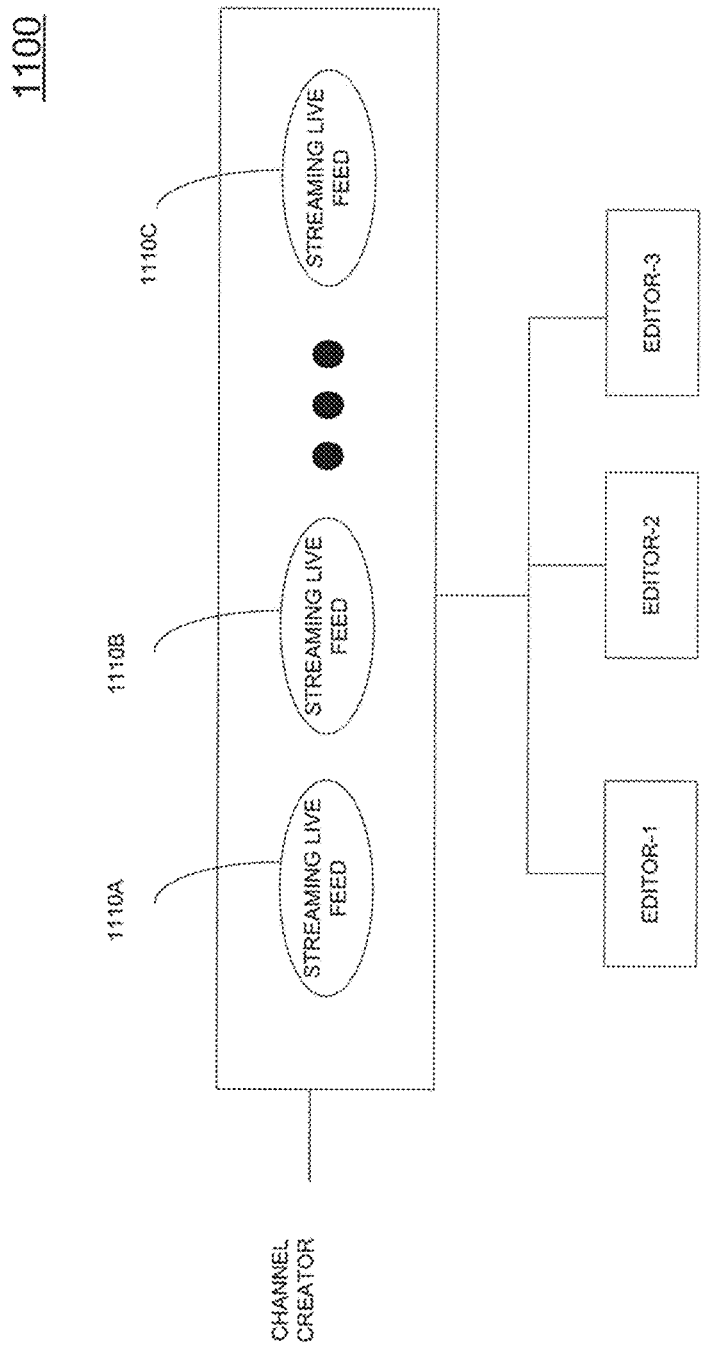
FIG. 11 is an illustration of multiple editors sharing the raw video footage as collected by a channel creator, in accordance with one embodiment of the present disclosure.

FIG. 11 is an illustration of multiple editors sharing the raw video footage as collected by a channel creator, in accordance with one embodiment of the present disclosure. For instance, a channel creator is able to collect a plurality of streamed live video feeds. In one embodiment, the raw footage that is stored is also provided to one or more editors (e.g., editor-1, editor-2, and editor-3). That is, instead of having only a single editor in association with the channel creator, multiple editors have access to the raw footage for purposes of post-production editing. Further, the editors have access to the final, edited video that was previously streamed. As such, the channel creator releases the raw footage as well as edited video to requesting editors. In that manner, additional edited videos are produced from the captured and streamed live video by individuals other than the channel creator.

Thus, according to embodiments of the present disclosure, systems and methods are described providing for the sourcing, editing, directing, and distributing of video streams related to an event, associated events, and/or events tied to a theme.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A method for video collaboration, comprising:
   identifying a plurality of candidate users, wherein each of the plurality of candidate users is associated with a respective social media account;
   identifying potential contributing users from the plurality of candidate users based on content associated with the candidate users' social media accounts;
   sending collaboration invitations to the contributing users;
   receiving a plurality of videos from one or more of the contributing users;
   editing one or more videos of the plurality of videos from the one or more contributing users;
   aggregating the edited one or more edited videos to generate an aggregate video; and
   transmitting the aggregate video.

2. The method of claim 1, wherein the collaboration invitations comprise an authentication link, and wherein activating the authentication link causes the respective social media accounts of the contributing users to be authenticated.

3. The method of claim 2, further comprising creating a video distribution channel, wherein said transmitting the aggregate video comprises transmitting the aggregate video over the video distribution channel, and wherein activating the authentication link further causes the respective contributing user to join the video distribution channel.

4. The method of claim 1, wherein the collaboration invitations comprise a shared channel key for authenticating the contributing users.

5. The method of claim 1, wherein said editing comprises adding at least one of an overlay, an image, a graphic, and an animation to the first video.

6. The method of claim 1, wherein the content comprises at least one of a social media group membership, a blog post, a comment, and a message.

7. A method for video collaboration comprising:
   identifying a plurality of candidate users, wherein each candidate user of the plurality of candidate users is associated with a respective social media account;
   determining if the plurality of candidate users are located within a geographic area to identify contributing users based on a location associated with the candidate users;
   sending collaboration invitations to the contributing users;
   receiving a plurality of videos from one or more of the contributing users;
   editing one or more videos of the plurality of videos from the one or more contributing users;
   aggregating the edited one or more edited videos to generate an aggregate video; and
   transmitting the aggregate video.

8. The method of claim 7, further comprising receiving a notification indicating that one or more candidate users of the plurality of candidate users are currently located within the geographic area.

9. The method of claim 8, wherein the notification is received from a social network that maintains the respective social media account of the contributing users.

10. The method of claim 9, wherein the respective social media accounts of the contributing users satisfy at least one criteria related to a topic, and wherein the topic is associated with the geographic area on the social network.

11. The method of claim 7, wherein the collaboration invitations comprise an authentication link, and wherein activating the authentication link causes the respective social media accounts of the contributing users to be authenticated.

12. The method of claim 11, further comprising creating a video distribution channel, wherein said transmitting the aggregate video comprises transmitting the aggregate video over the video distribution channel, and wherein activating the authentication link further causes the respective contributing user to join the video distribution channel.

13. The method of claim 7, wherein the collaboration invitations comprise a shared channel key for authenticating the contributing users.

14. The method of claim 7, wherein said editing comprises adding at least one of an overlay, an image, a graphic, and an animation to the first video.

15. A method for video collaboration, comprising:
creating a distribution channel for distributing a broadcast window, wherein the broadcast window comprises a prominent portion, a secondary portion, and a common communication interface;
sending collaboration invitations to a plurality of social media accounts;
receiving a plurality of user video streams from the social media accounts;
selecting a first user video stream of the plurality of user video streams as a viewing stream;
displaying the viewing stream in the prominent portion of the broadcast window;
displaying one or more user video streams of the plurality of user video streams in the secondary portion of the broadcast window, wherein selecting a second user video stream displayed in the secondary portion of the broadcast window causes the second video stream to be selected as the viewing stream and to be displayed in the prominent portion of the broadcast window;
displaying the common communication interface in the broadcast window, wherein the common communication interface is configured to receive and display messages from the plurality of social media accounts; and
broadcasting the broadcast window over the distribution channel.

16. The method of claim 15, wherein the collaboration invitations comprise an authentication link, and wherein activating the authentication link causes the respective social media accounts to be authenticated.

17. The method of claim 16, wherein activating the authentication link further causes the respective user to join the distribution channel.

18. The method of claim 15, wherein the collaboration invitations comprise a shared channel key for authenticating users.

19. The method of claim 15, further comprising editing the viewing stream by displaying at least one of an overlay, an image, a graphic, and an animation in the viewing stream when broadcasting the broadcast window over the distribution channel.

20. The method of claim 15, wherein the social media accounts satisfy at least one criteria related to at least one of a topic and a geographic area.

\* \* \* \* \*